United States Patent
Peters

(10) Patent No.: US 6,198,072 B1
(45) Date of Patent: Mar. 6, 2001

(54) PLANOCENTRIC GEAR FOR AMPERAGE INDICATOR ON WELDING MACHINE

(75) Inventor: Mark E. Peters, Menasha, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/167,850

(22) Filed: Oct. 7, 1998

(51) Int. Cl.⁷ ............................................. B23K 9/10
(52) U.S. Cl. ............................................... 219/130.1
(58) Field of Search ......................... 219/130.1, 130.5, 219/132; 336/45, 133

(56) References Cited

U.S. PATENT DOCUMENTS

| | | | |
|---|---|---|---|
| Re. 22,609 | * 2/1945 | Steinert | 336/45 |
| 1,098,549 | * 6/1914 | Barnum | 336/133 |
| 1,350,077 | 8/1920 | Loudon . | |
| 2,133,919 | * 10/1938 | Fries | 219/130.1 |
| 2,370,872 | 3/1945 | Miller et al. | 172/239 |
| 2,411,370 | * 11/1946 | Fries | 336/133 |
| 2,460,921 | * 2/1949 | Candy | 336/133 |
| 2,931,967 | * 4/1960 | Mills | 219/130.1 |
| 3,129,382 | 4/1964 | Scott | 323/43.5 |
| 3,262,081 | 7/1966 | Fairbanks | 338/155 |
| 4,379,976 | 4/1983 | Pitchford et al. | 310/83 |
| 4,412,794 | 11/1983 | Presley | 418/61 R |
| 5,120,924 | 6/1992 | Hirane | 219/118 |
| 5,639,392 | 6/1997 | Weller et al. | 219/130.1 |
| 5,660,749 | 8/1997 | Taguchi et al. | 219/130.1 |
| 5,669,843 | 9/1997 | Bolton et al. | 475/149 |
| 5,683,598 | 11/1997 | Moro | 219/108 |

* cited by examiner

*Primary Examiner*—Clifford C. Shaw
(74) *Attorney, Agent, or Firm*—Mark W. Croll; John P. O'Brien; Donald J. Breh

(57) ABSTRACT

A shunt controlled welding machine has a regulator handle and a scale that indicates output amperage on the same panel of the welding machine case. The handle attaches to a shaft that rotates about an axis of rotation to move a shunt into and out of a transformer. The handle is part of a planocentric gear. Teeth on an indicator mesh with teeth on a pinion that is fixed to the case panel. By turning the handle, the indicator orbits and slowly revolves about the shaft axis of rotation. The indicator has a pointer that indicates the welding machine output amperage on the scale.

6 Claims, 4 Drawing Sheets

PLANOCENTRIC GEAR FOR AMPERAGE INDICATOR ON WELDING MACHINE

BACKGROUND OF THE INVENTION

1. Field of the Invention

This invention pertains to welding machines, and more particularly to apparatus that manually regulates and visually indicates the output amperage of shunt controlled welding machines.

2. Description of the Prior Art

The output of some welding machines is regulated by a shunt that moves into and out of a transformer inside the welding machine case. The shunt is typically designed to be moved by a screw and nut arrangement. One end of a shaft protrudes through a first case panel and has a crank attached to it. The other end of the shaft has threads that mate with a nut on the shunt. Manually turning the crank causes the shunt to move linearly within the case. Examples of prior welding machines that employ a shunt and crank regulating system may be seen in U.S. Pat. Nos. 5,639,392 and 5,660,749. A generally similar welding machine is manufactured by Miller Electric Company, Appleton, Wis., under the trademark Thunderbolt.

To determine the shunt position relative to the transformer, and thus indicate the welding machine output amperage, it is known to include a wiper that is attached to the shunt. The wiper moves linearly inside the welding machine case with the shunt in response to turning the crank mounted on a shaft protruding from a first panel of the machine case. An elongated opening through a second panel of the machine case at a right angle to the first panel enables a person to see the wiper position. A scale on the outside of the case second panel adjacent the opening provides correlation between the shunt position and the welding machine output.

In another shunt controlled welding machine, there is an elongated rectangular opening in the same panel through which the crank shaft protrudes. The opening is at some distance from the crank. A long flexible band is attached at one end to the shunt and at a second end to a spring. In turn, the spring is connected to a stationary part of the welding machine. Manually turning the crank causes the shunt to move and also causes the band to slide within the opening. The band is marked in a manner that cooperates with a linear scale adjacent the opening to indicate the welding machine output in relation to the shunt position. An example of a prior shunt controlled welding machine having a crank and linearly moving indicator band on the same panel is a machine manufactured by Miller Electric Company, Appleton, Wis., under the trademark Econo Twin.

The prior shunt controlled welding machines provide excellent performance at an economical cost. Nevertheless, it is desirable that the mechanism for indicating the welding machine output be further developed.

SUMMARY OF THE INVENTION

In accordance with the present invention, a planocentric gear is provided that indicates the output amperage of a shunt controlled welding machine. This is accomplished by apparatus that includes a high gear reduction between a turnable handle and a revolving pointer.

The welding machine has a transformer inside a case. A shunt includes a threaded block. Threads on one end of a shaft mate with the block threads. The other end of the shaft extends through a panel of the case. Attached to the shaft outside of the case panel is the handle. By turning the handle, the shaft rotates to linearly move the shunt into greater or lesser engagement with the welding machine transformer.

The handle is formed with an annular recess partially defined by a hub external surface and by an internal annular surface. The hub external surface is concentric with the axis of rotation of the shaft. The handle internal annular surface is eccentric to the shaft axis of rotation.

Fixed to the case concentric with the shaft axis of rotation and within the handle recess is a pinion. Around the pinion outer diameter are a number of teeth. An inner diameter of the pinion loosely pilots over the hub external surface of the handle.

The planocentric gear further comprises an indicator that is also within the handle recess. The indicator has an outer diameter that fits with a running clearance inside the eccentric internal annular surface of the handle. The indicator also has a number of internal teeth that are concentric with the indicator outer diameter. The indicator teeth mesh with the pinion teeth. The indicator has at least one more tooth than the pinion. The pointer is part of the indicator and is outwardly directed from an outer periphery of the indicator. A scale is imprinted on the welding machine case around the shaft axis of rotation. The scale is calibrated to correlate welding machine output amperage with the position of the indicator pointer.

In operation, the welding machine operator turns the handle to obtain the desired output amperage from the welding machine. Turning the handle causes its eccentric internal annular surface to force the indicator to orbit about the shaft axis of rotation. Superimposed on the indicator orbiting is a revolving of the indicator about the shaft axis of rotation in the same direction as the handle turning, but at a much slower speed. Specifically, for each complete turn of the handle and corresponding complete orbit of the indicator, the indicator undergoes a partial revolution by advancing one tooth on the pinion. The indicator pointer thus revolves in proportion to the handle turns and indicates the welding machine output amperage from the scale imprinted on the case.

The method and apparatus of the invention, using a planocentric gear, thus provides a very economical way to indicate output amperage of a shunt controlled welding machine. The planocentric gear is on the same machine panel as the handle, thereby improving accessibility to and versatility in placement of the welding machine.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
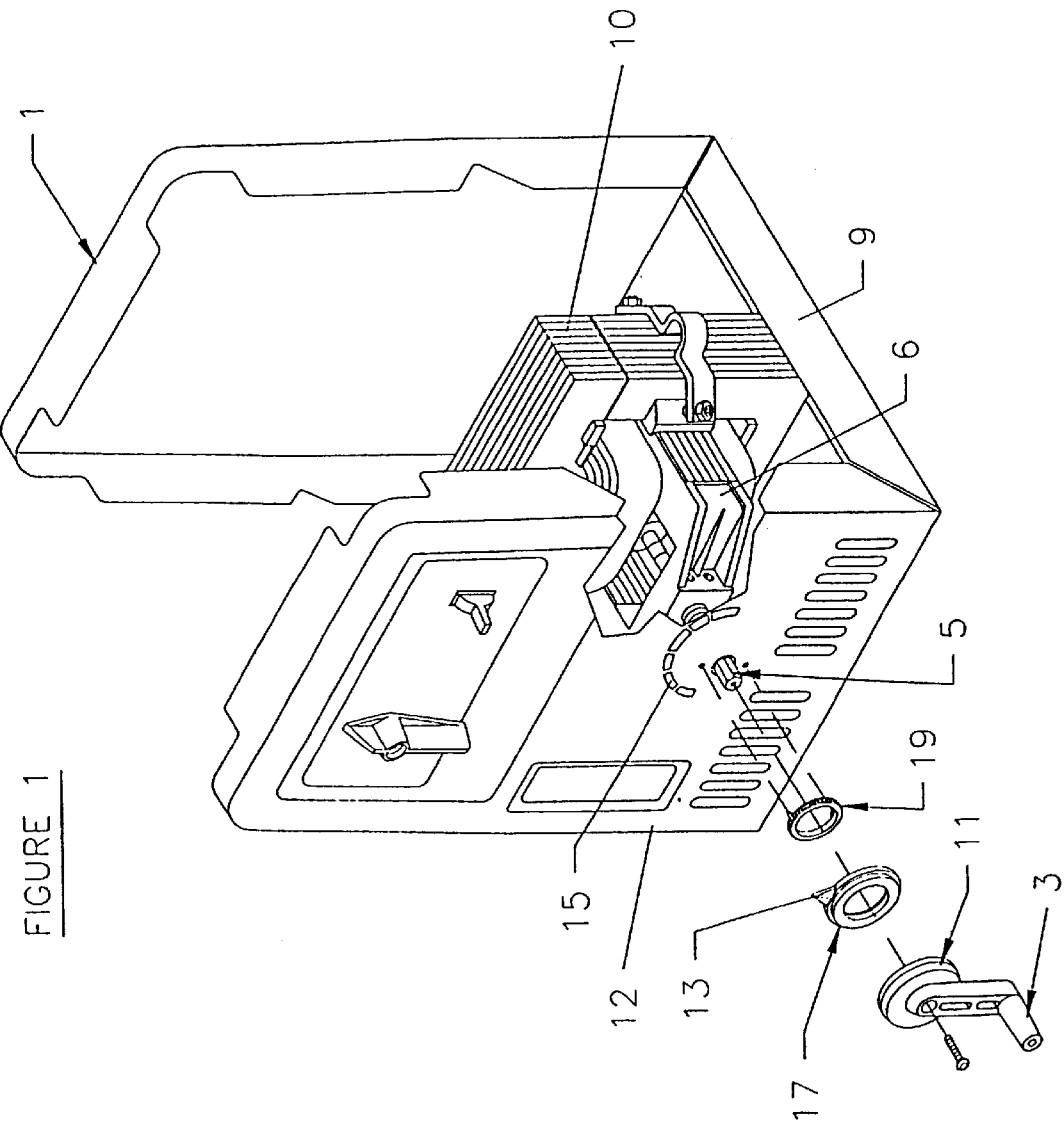
FIG. 1 is an exploded view of a typical shunt controlled welding machine that includes the present invention.
Figure 2:
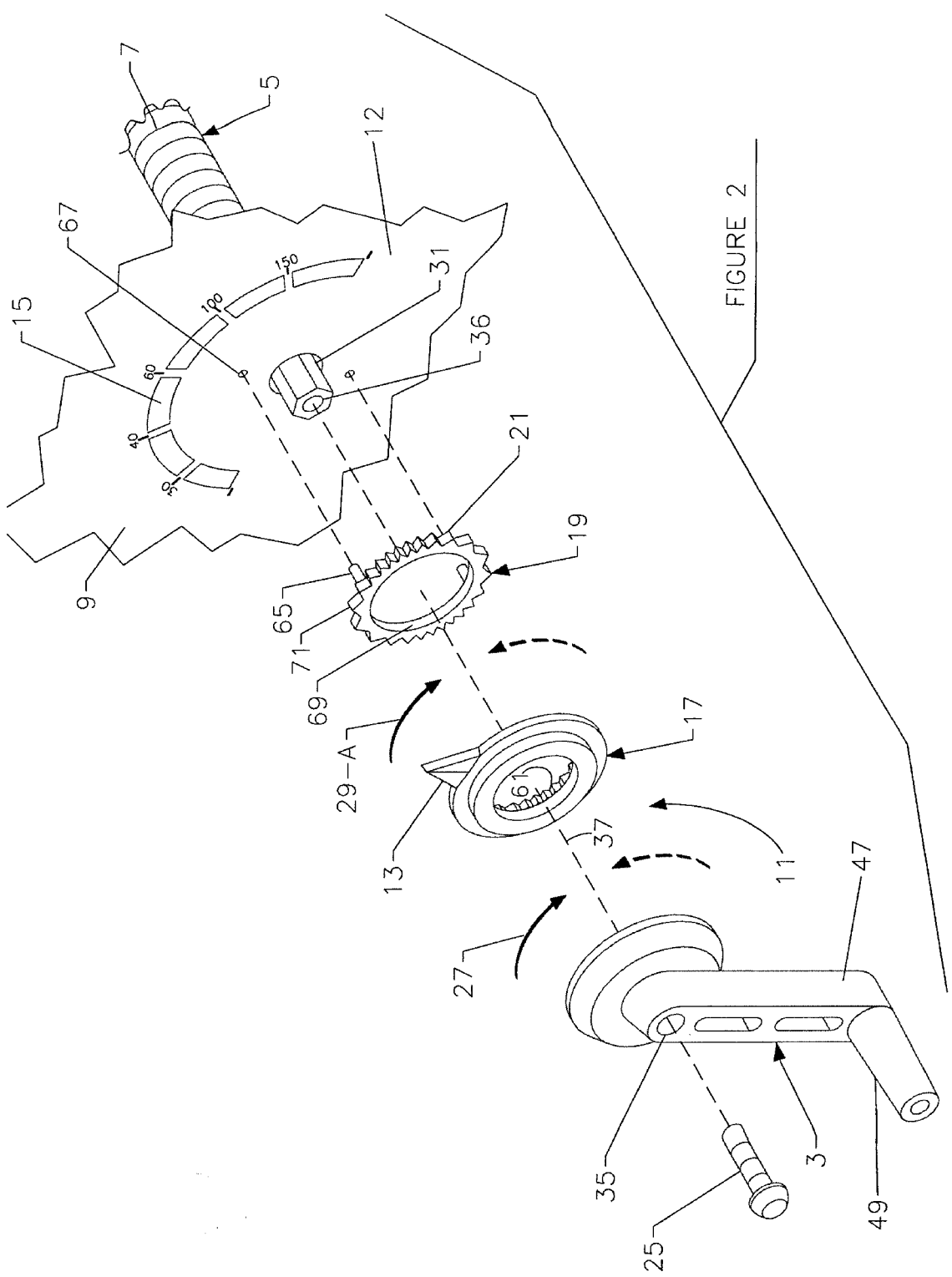
FIG. 2 is an exploded view of the invention.

Referring to FIGS. 1 and 2, a typical shunt controlled welding machine 1 is illustrated that includes the present invention. The output amperage of the welding machine 1 is regulated by turning a handle 3. Turning the handle 3 rotates a shaft 5. The shaft 5 has threads 7 on one end that mate with threads in a shunt block 6 inside the welding machine case 9. By turning the handle, the shunt block 6 moves into and out of a transformer 10 inside the welding machine case 9 to regulate the welding machine amperage output.

In accordance with the present invention, a planocentric gear 11 indicates the output amperage of the welding machine 1. The planocentric gear 11 includes a pointer 13 that revolves in proportion to the turns of the handle 3. The pointer 13 indicates the output amperage as printed on a circular scale 15 on a panel 12 of the welding machine case 9.

The planocentric gear 11 is comprised of the handle 3, an indicator 17, and a pinion 19. The pinion 19 is fixed to the panel 12 of the welding machine case 9. External gear teeth 21 on the pinion mesh with internal teeth 61 on the indicator 17. The handle is attached to the shaft 5 by a screw 25 with the indicator and the pinion lying in a recess between the handle and the panel 12. Turning the handle in the direction of arrow 27 in FIG. 2 causes the indicator to revolve in the same direction 29-A. (No. 29 is also used to refer to the opening in panel 12)

Figure 3:
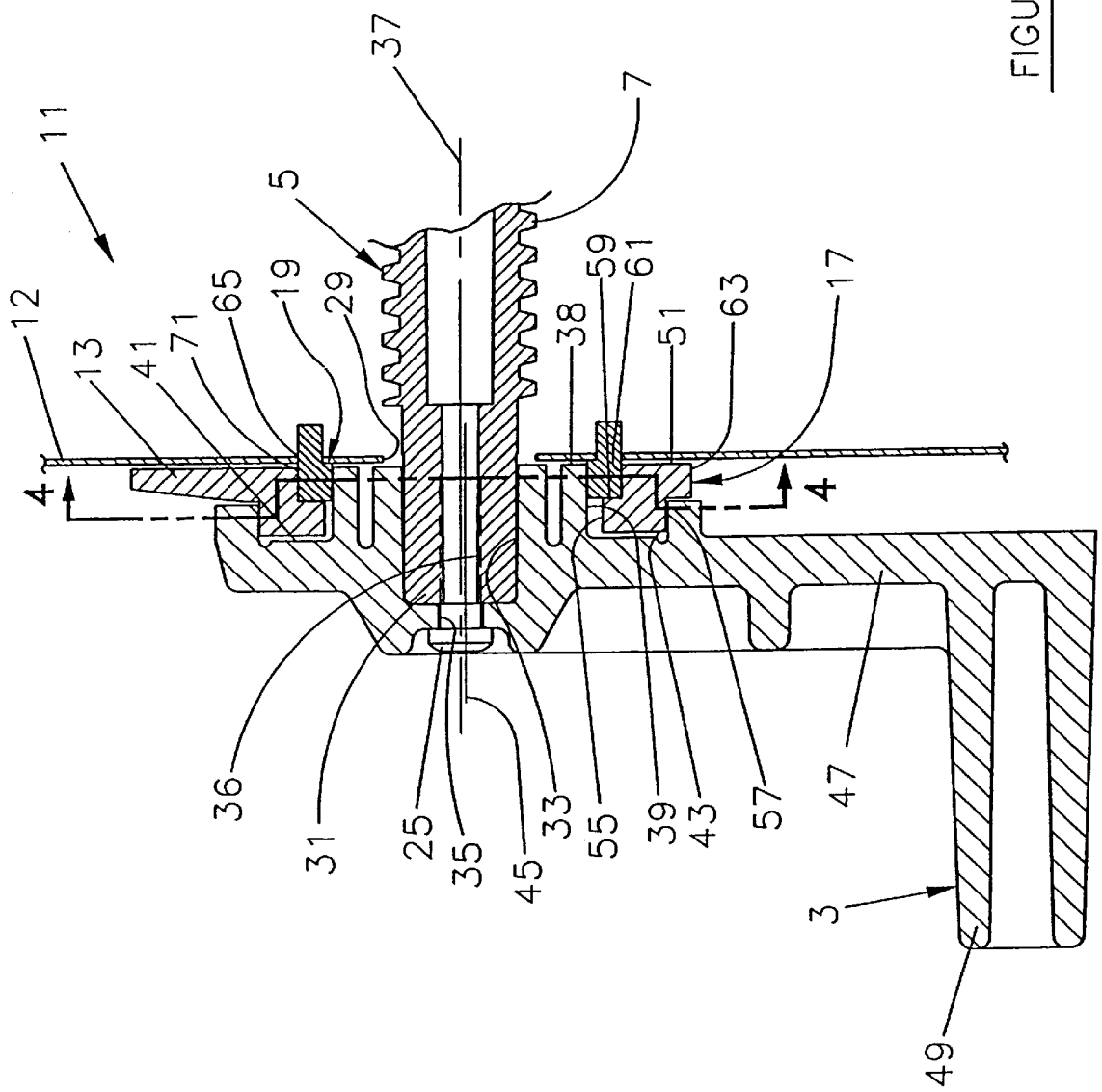
FIG. 3 is a longitudinal cross sectional view of the invention.

The shaft second end is rotatably supported in an opening 29 in the welding machine panel 12, FIG. 3. The shaft second end preferably has an external hex 31. The handle 3 has an internal hex 33 that receives the hex end 31 of the shaft 5. The screw 25 passes through a clearance hole 35 in the handle and into a tapped hole 36 in the shaft second end. The shaft is thus captured in the welding machine 1 for rotation about an axis 37. An end surface 38 of the handle has sliding clearance with the machine panel 12.

Figure 4:
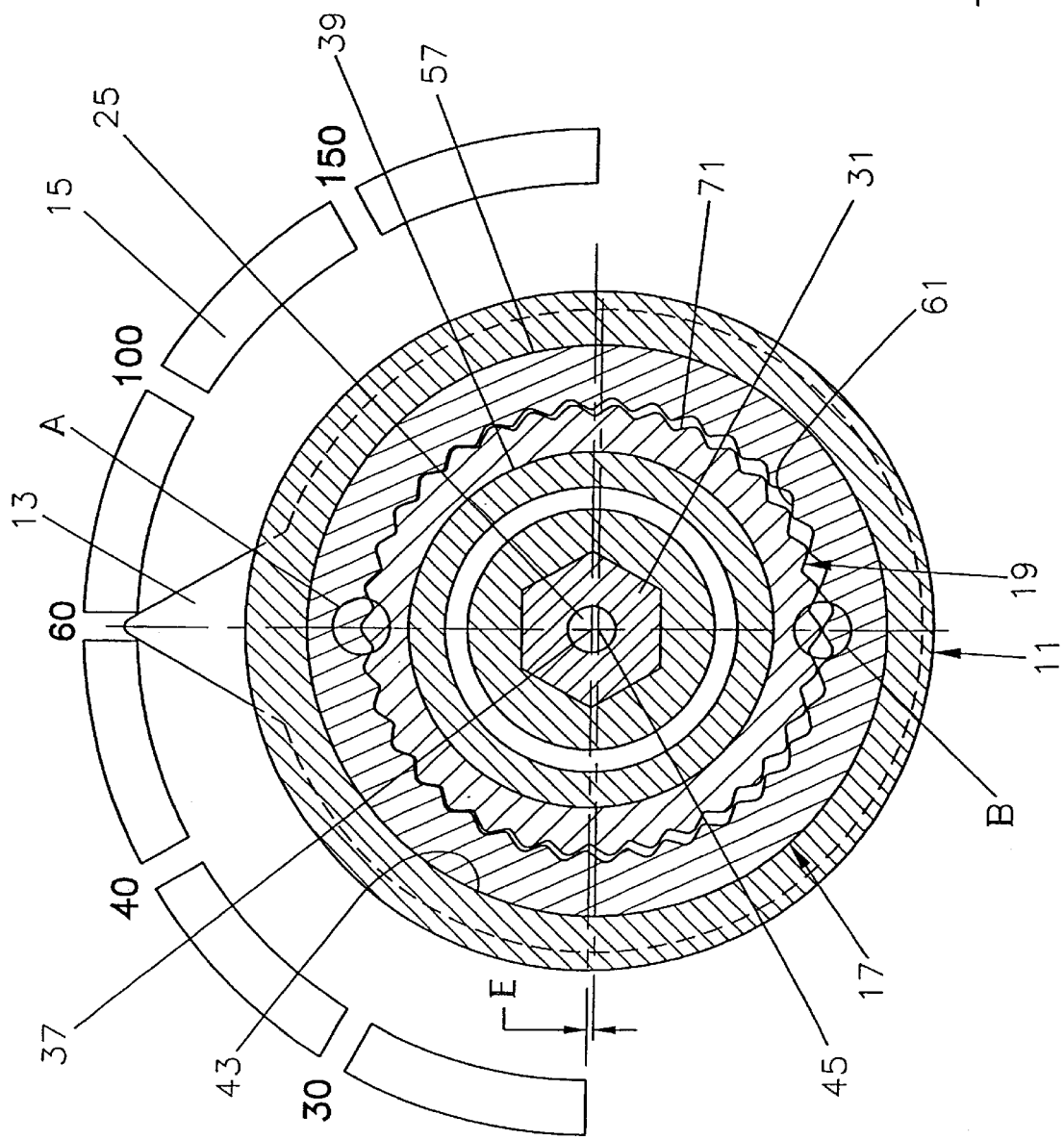
FIG. 4 is a cross sectional view on an enlarged scale taken along line 4—4 of FIG. 3.

The handle 3 is further constructed with a hub having an external surface 39 that is concentric with the shaft axis of rotation 37. The hub external surface 39 terminates in a flat radial surface 41. The radial surface 41 ends at an internal annular surface 43. The interior annular surface 43 has a centerline 45 that is eccentric to the axis of rotation 37 by a distance E. Also see FIG. 4. There is an arm 47 on the handle. On the free end of the arm 47 is a hand grip 49.

In the illustrated construction, the indicator 17 is captured between the machine panel 12 and a handle recess that is partially defined by the internal annular surface 43 and the radial surface 41. The indicator has an inner diameter 55 that has adequate diametrical clearance with the handle hub external surface 39. The indicator also has an outer diameter 57 that engages the hub internal annular surface 43 with a running clearance. The indicator outer diameter 57 is thus concentric with the eccentric centerline 45. Undercut from the indicator inner diameter 55 is a radial surface 59 that ends at internal gear teeth 61. The gear teeth 61 are concentric with the indicator outer diameter 57 and thus are concentric with the handle eccentric centerline 45. The gear teeth 61 have a very high pressure angle, such as 55 degrees. A diametral pitch of 22 for the teeth is satisfactory. Opposite the teeth is an outer periphery 63. The pointer 13 projects outwardly from the indicator outer periphery 63.

The pinion 19 is fixed to the case panel 12. For example, the pinion may have a pair of integral pins 65 that tightly fit into corresponding holes 67 in the machine panel. The pinion has an inner diameter 69 that has a running clearance with the handle hub external surface 39. The outer periphery of the pinion has a number of gear teeth 71. The pinion teeth 71 are concentric with the pinion inner diameter 69 and are thus concentric with the shaft axis of rotation 37. The pinion teeth 71 mesh with the indicator teeth 61.

The number of indicator teeth 61 is at least one greater than the number of pinion teeth 71. In a particular embodiment of the invention, there are 35 teeth on the indicator 17 and 34 teeth on the pinion 19. The difference in the number of teeth, together with the eccentricity E of the indicator and pinion, result in the indicator and pinion teeth being in complete mesh with each other only at a point represented by letter A, which is on the opposite side of the axis of rotation 37 as the eccentric centerline 45. At the same time, the indicator and pinion teeth at the point represented by letter B, which is on the same side of the axis of rotation 37 as the eccentric centerline 45, are completely out of mesh with each other.

In operation, the planocentric gear 11 is assembled such that the pointer 13 is at a location on the scale 15 that represents a minimum output amperage of the welding machine 1. The planocentric gear is timed with the position of the shunt block 6 relative to the machine transformer 10 such that the corresponding minimum amount of output amperage is actually produced. Turning the handle 3, as in the direction of arrow 27, causes the shaft 5 to move the shunt block 6 out of the transformer 10 and thus increase the machine output amperage. Simultaneously, the indicator pointer revolves in the direction of arrow 29-A, but at a much lesser amount. Indicator revolving is caused by the engagement of the handle eccentric internal annular surface 43 with the indicator outer diameter 57. As the handle turns, the eccentric annular surface 43 progressively forces the indicator to orbit in a circle around the shaft axis of rotation 37. The indicator makes one orbit for each turn of the handle. Simultaneously with the indicator orbiting about the axis of rotation 37, the point A of complete meshing between the indicator teeth 61 and the pinion teeth 71 advances around the pinion teeth in proportion to and in the same direction as the indicator is orbiting. Consequently, the indicator revolving about the axis of rotation 37 by advancing around the pinion teeth is superimposed on the indicator orbiting. For a pinion 19 having 34 teeth and an indicator 17 having 35 teeth, the indicator advances one tooth on the pinion for every turn of the handle. Thirty-four turns of the handle thus result in one revolution of the indicator.

The scale 15 is calibrated to read the machine output amperage as a function of the shunt block position. With commercially acceptable embodiments of the welding machine 1, less than 34 turns of the handle 3 are used to produce the full range from minimum to maximum machine output amperage. Accordingly, the indicator pointer 13 makes less then one complete revolution over the full operating range of the welding machine.

Thus, it is apparent that there has been provided, in accordance with the invention, a planocentric gear for amperage indicator on a welding machine that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A shunt controlled welding machine comprising:
   a. a case having a panel;
   b. a transformer and a shunt inside the case;
   c. a shaft extending through the panel and defining an axis of rotation, the shunt moving relative to the transformer in response to rotating the shaft to thereby regulate the output amperage of the welding machine;
   d. a generally circular scale imprinted on the panel concentric with the shaft axis of rotation and calibrated with the welding machine output amperage; and
   e. means for indicating on the scale the welding machine output amperage, said means comprising:
      i. a pinion fixed to the panel and having a predetermined number of teeth;
      ii. a handle attached to the shaft; and
      iii. and indicator having teeth meshing with the pinion teeth and revolving about the shaft axis of rotation in proportion to the turning of the shaft, the indicator indicating on the scale the welding machine output amperage.

2. The welding machine of claim 1 wherein the indicator revolves a distance of one tooth on the pinion for every complete turn of the shaft.

3. The welding machine of claim 1 wherein the indicator makes less than one full revolution around the shaft axis of rotation in response to the shaft turning sufficiently to regulate the welding machine between minimum and maximum output amperages thereof.

4. In a welding machine having a case with a transformer and a shunt that cooperate to produce output amperages over a range from minimum to maximum:
   a. regulator for moving the shunt relative to the transformer and thereby regulating the welding machine output amperage, the regulator comprising:
      i. a shaft defining an axis of rotation and extending through the case selected panel, the shaft coacting with the shunt to regulate the welding machine output amperage in response to rotation of the shaft; and
      ii. a handle attached to the shaft for rotating the shaft and thereby regulating the welding machine output amperage; and
      iii. a gear comprising a pinion fixed to the case selected panel and an indicator meshing with the pinion and revolving about the shaft axis of rotation in response to turning the handle; and
   b. indicia on a selected panel of the case representative of the welding machine output amperage, the indicia being arranged on the selected panel in a generally circular shape and concentric with the shaft axis of rotation, the indicator cooperating with the indicia on the case selected panel to indicate the welding machine output amperage.

5. The welding machine of claim 4 wherein the indicator makes less than one revolution in response to the handle turning sufficiently for the welding machine to produce a range of output amperages from minimum to maximum.

6. The welding machine of claim 4 wherein:
   a. the pinion has a first number of teeth, and wherein the indicator has a second number of teeth one more than the first number; and
   b. the indicator revolves around the indicia on the case selected panel a distance of one pinion tooth for every turn of the handle.

* * * * *